Sept. 25, 1951 W. A. GRUENEBERG 2,568,802
MACHINE FOR THE MANUFACTURE OF MOLDED BUILDING UNITS
Filed July 9, 1947 8 Sheets-Sheet 2
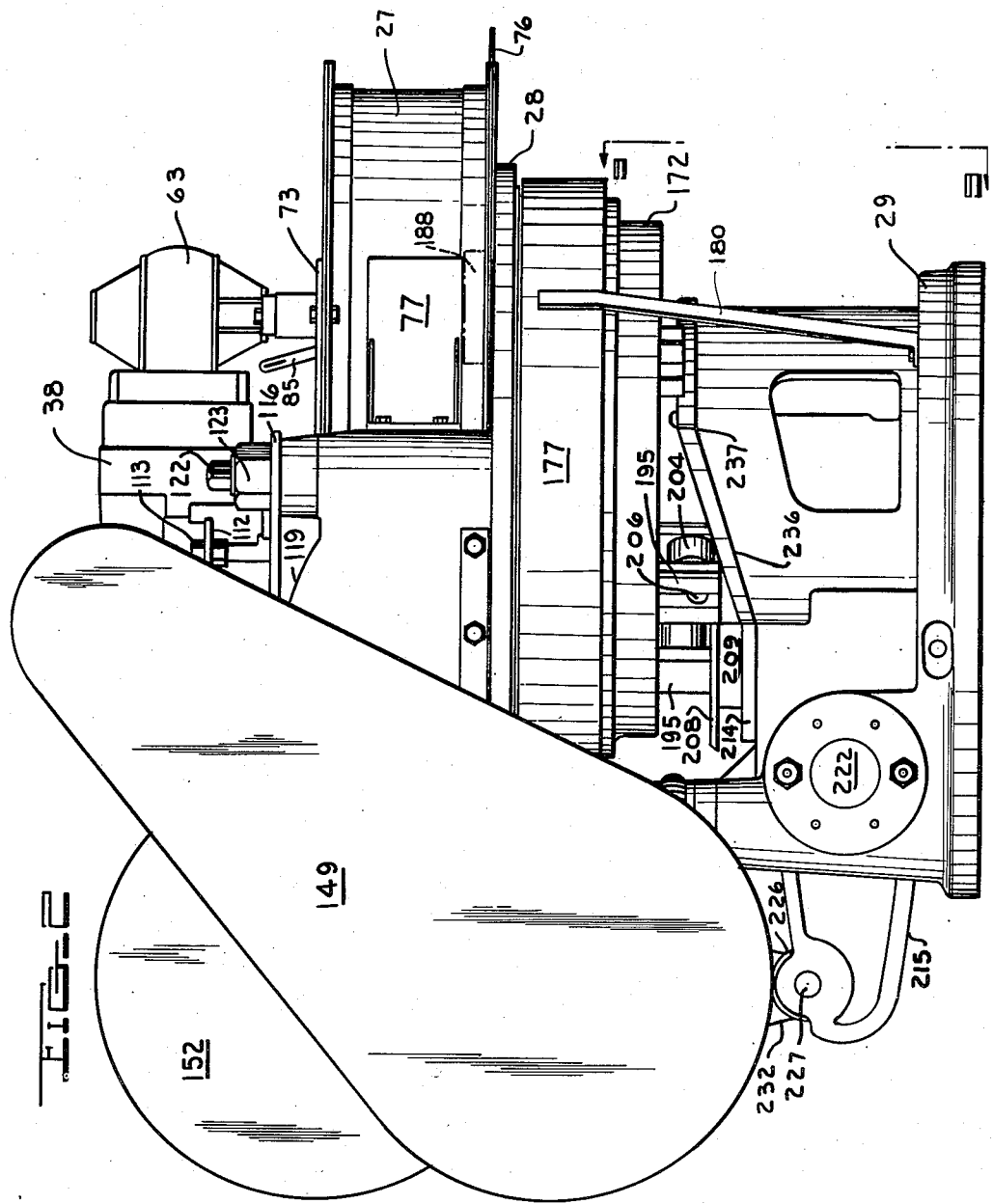
INVENTOR.
WALTER A. GRUENEBERG
BY
ATTORNEY

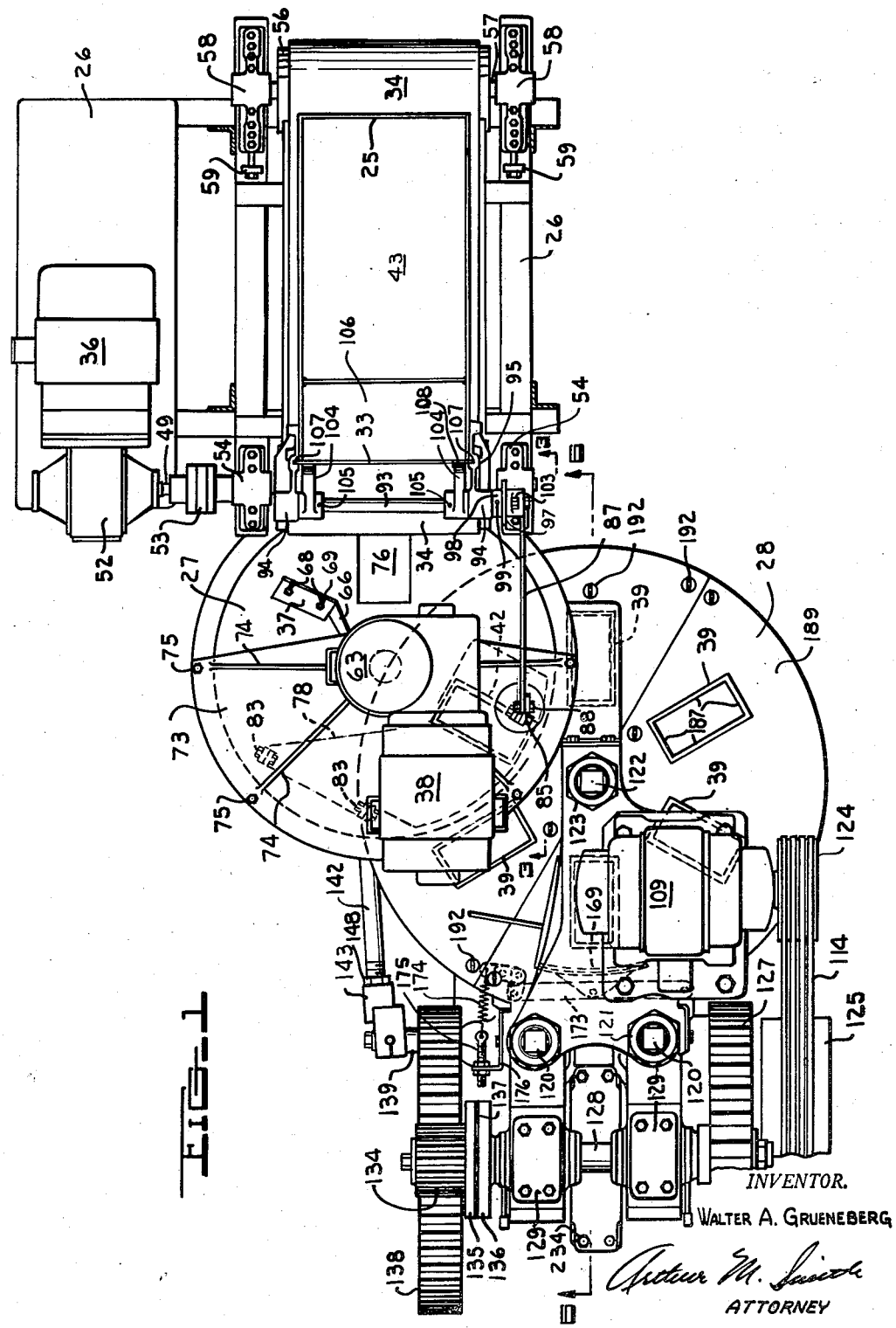

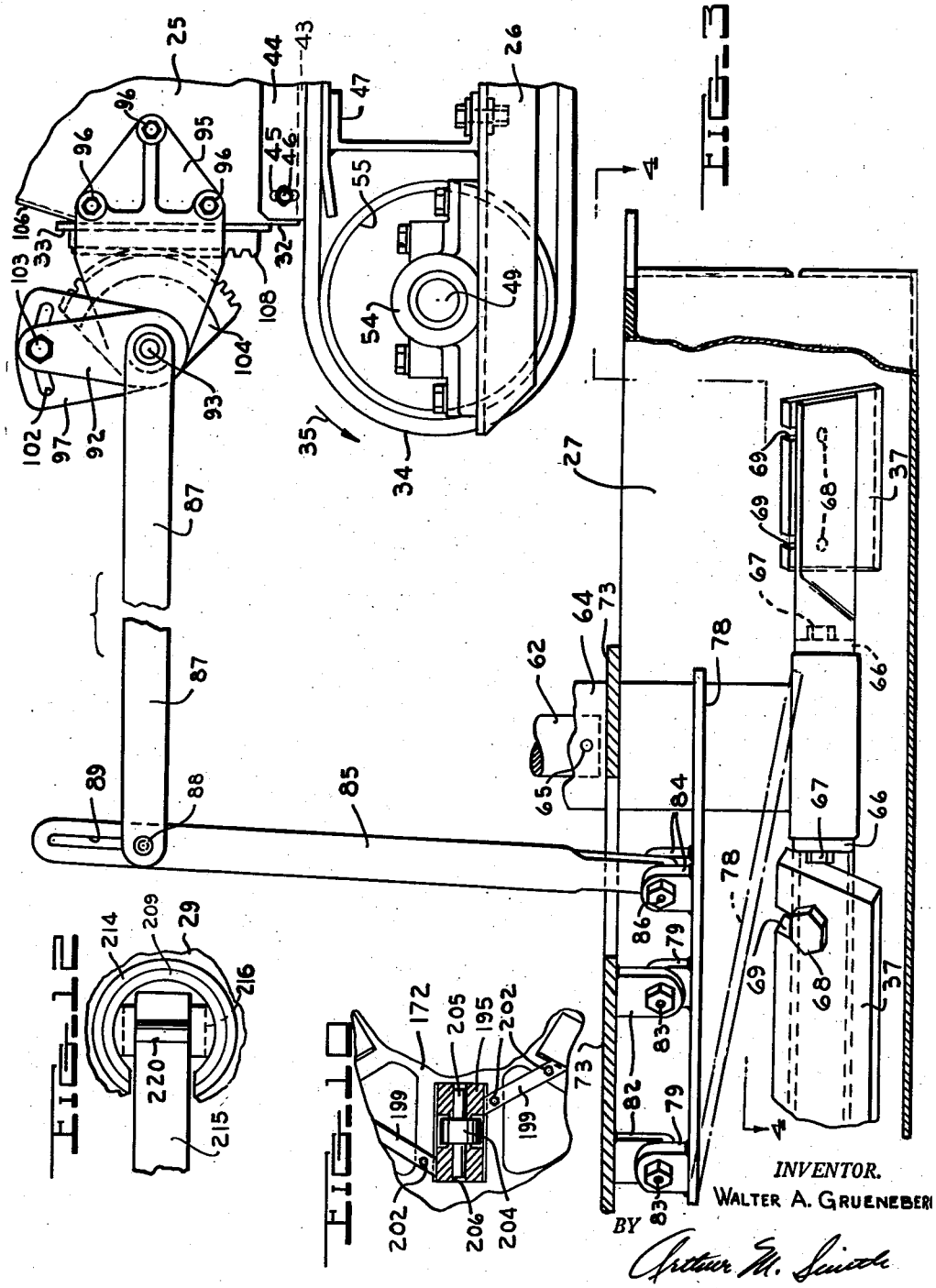

Sept. 25, 1951  W. A. GRUENEBERG  2,568,802
MACHINE FOR THE MANUFACTURE OF MOLDED BUILDING UNITS
Filed July 9, 1947  8 Sheets-Sheet 4
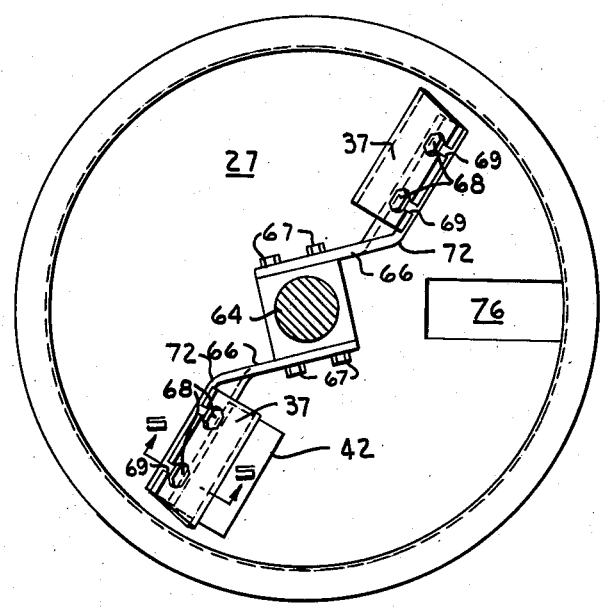
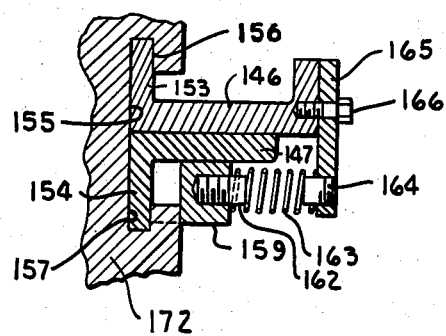
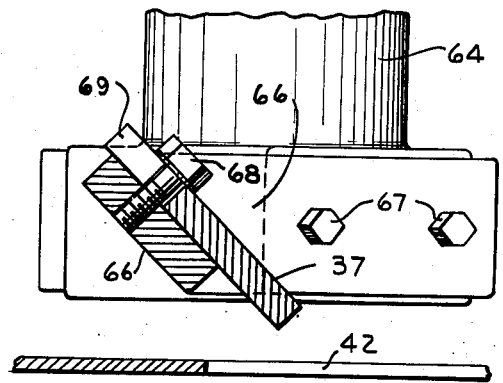
INVENTOR.
WALTER A. GRUENEBERG
BY
ATTORNEY Sept. 25, 1951 W. A. GRUENEBERG 2,568,802
MACHINE FOR THE MANUFACTURE OF MOLDED BUILDING UNITS
Filed July 9, 1947 8 Sheets-Sheet 5
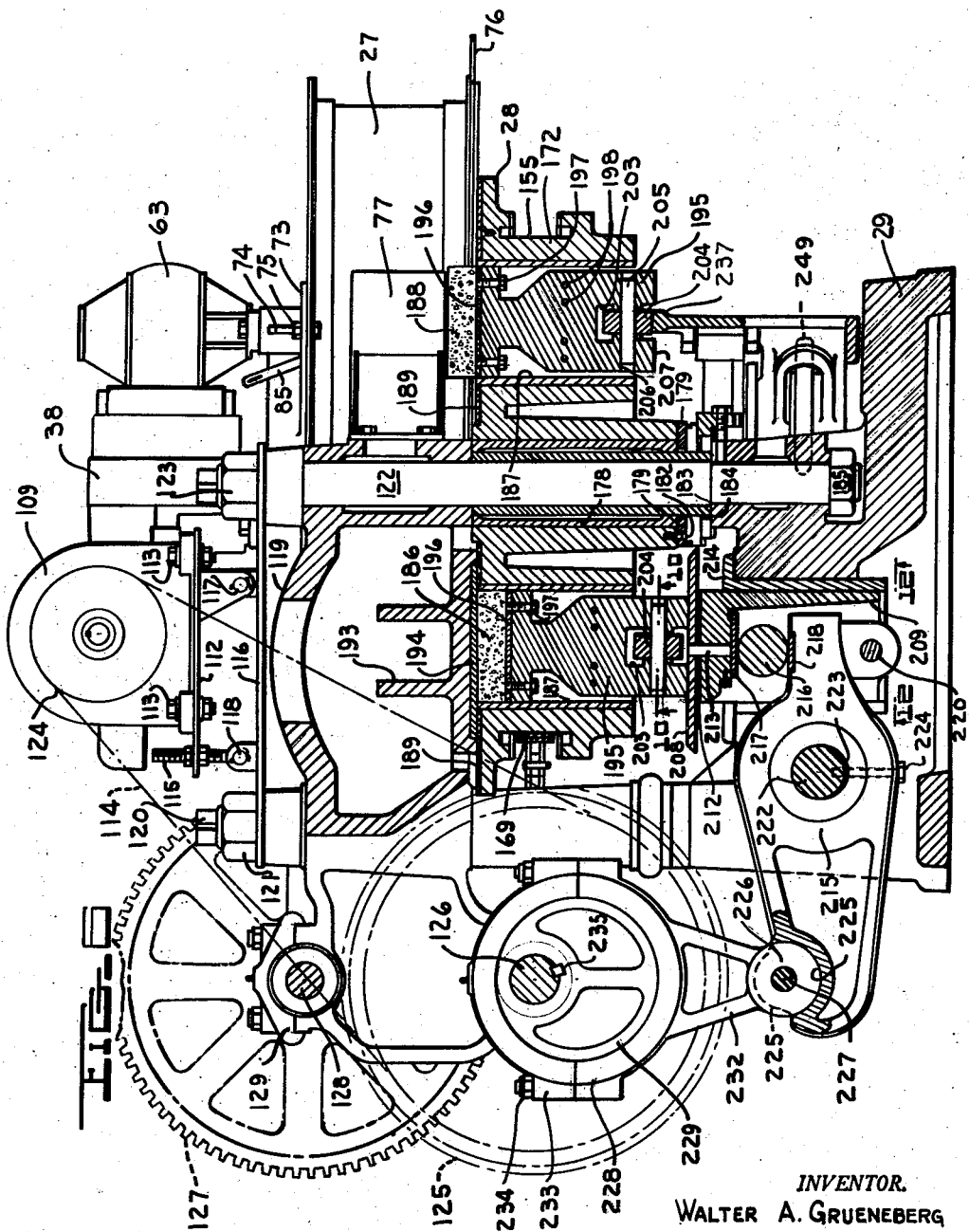
INVENTOR.
WALTER A. GRUENEBERG
BY
ATTORNEY

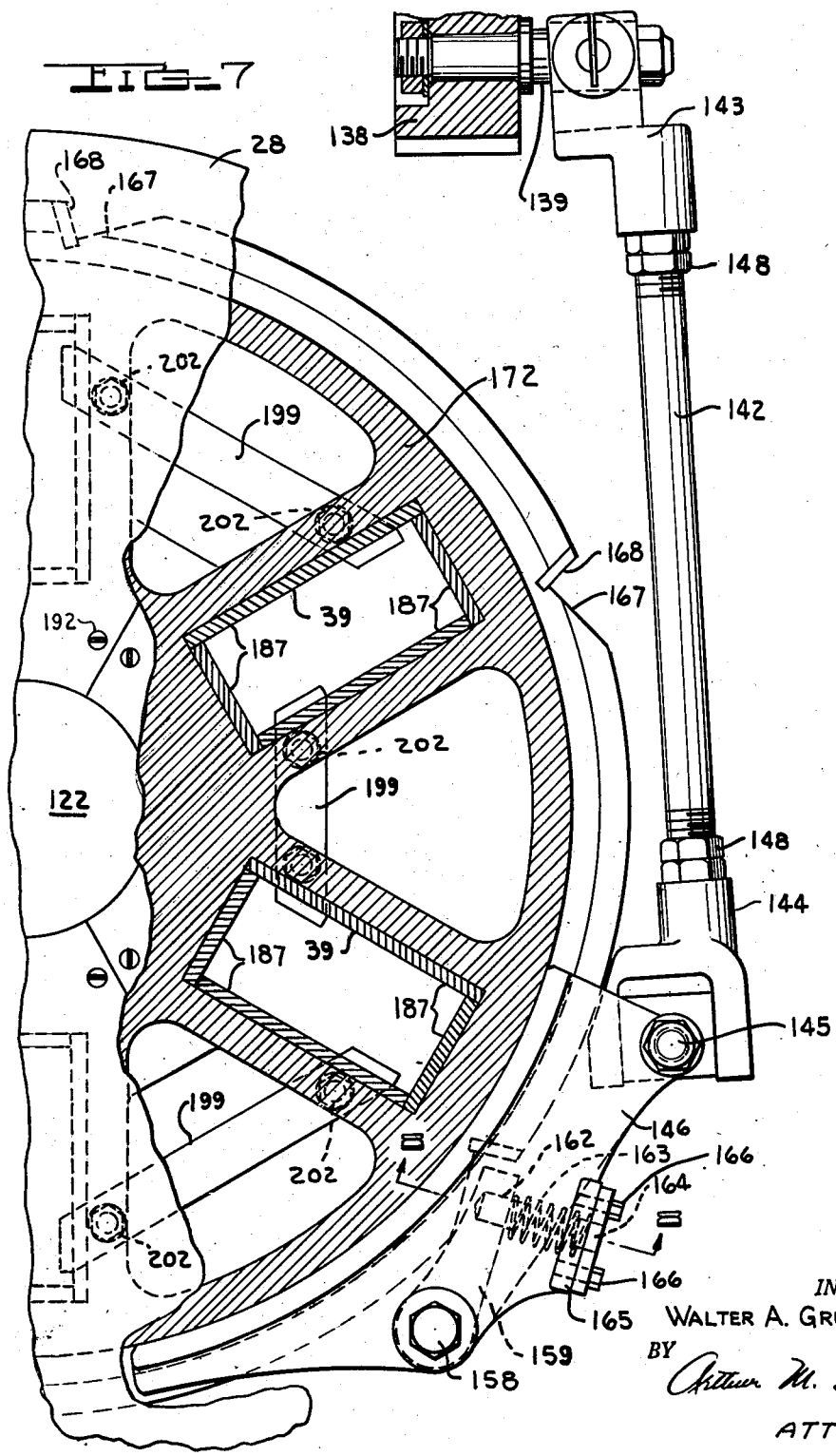

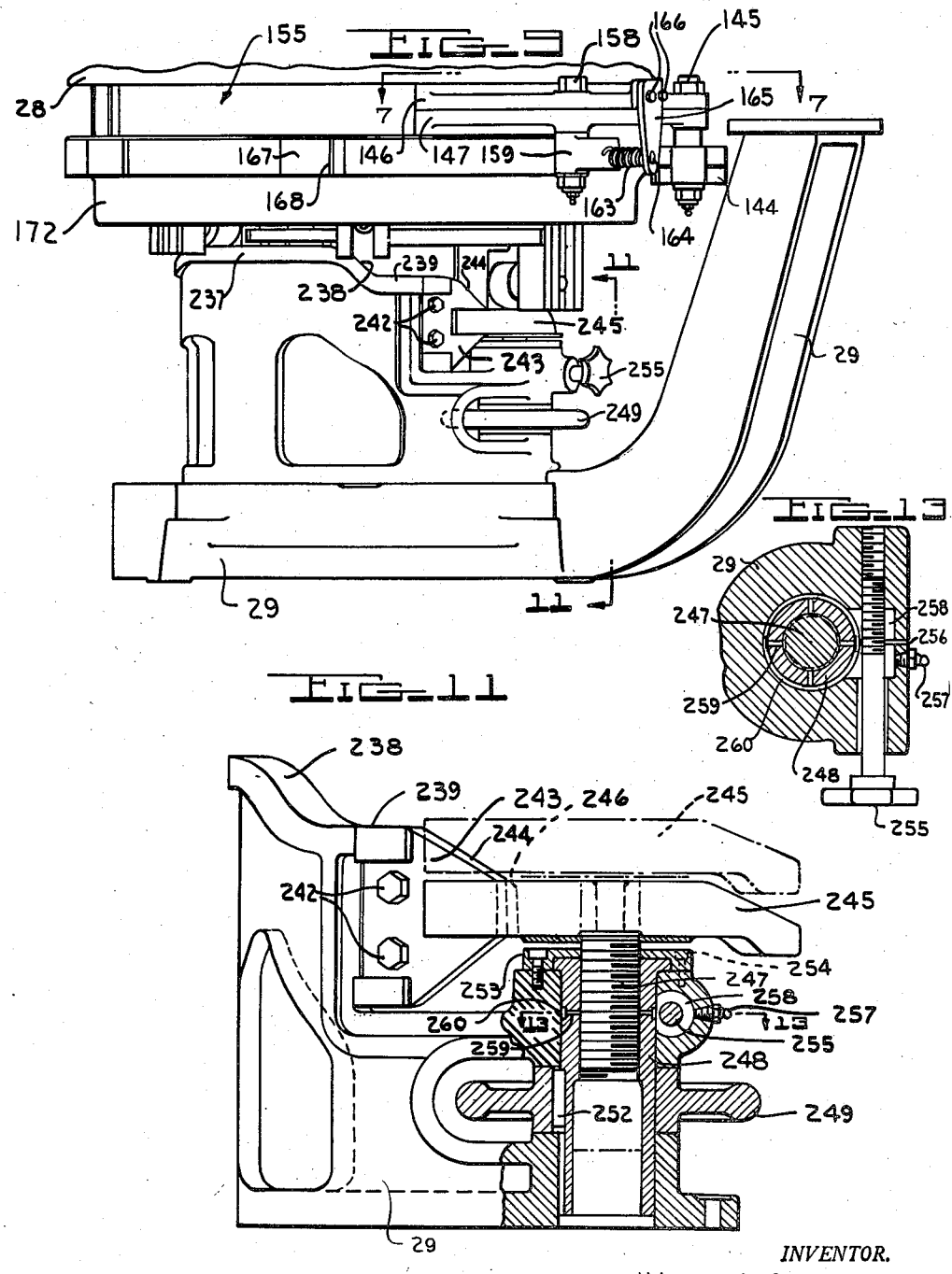

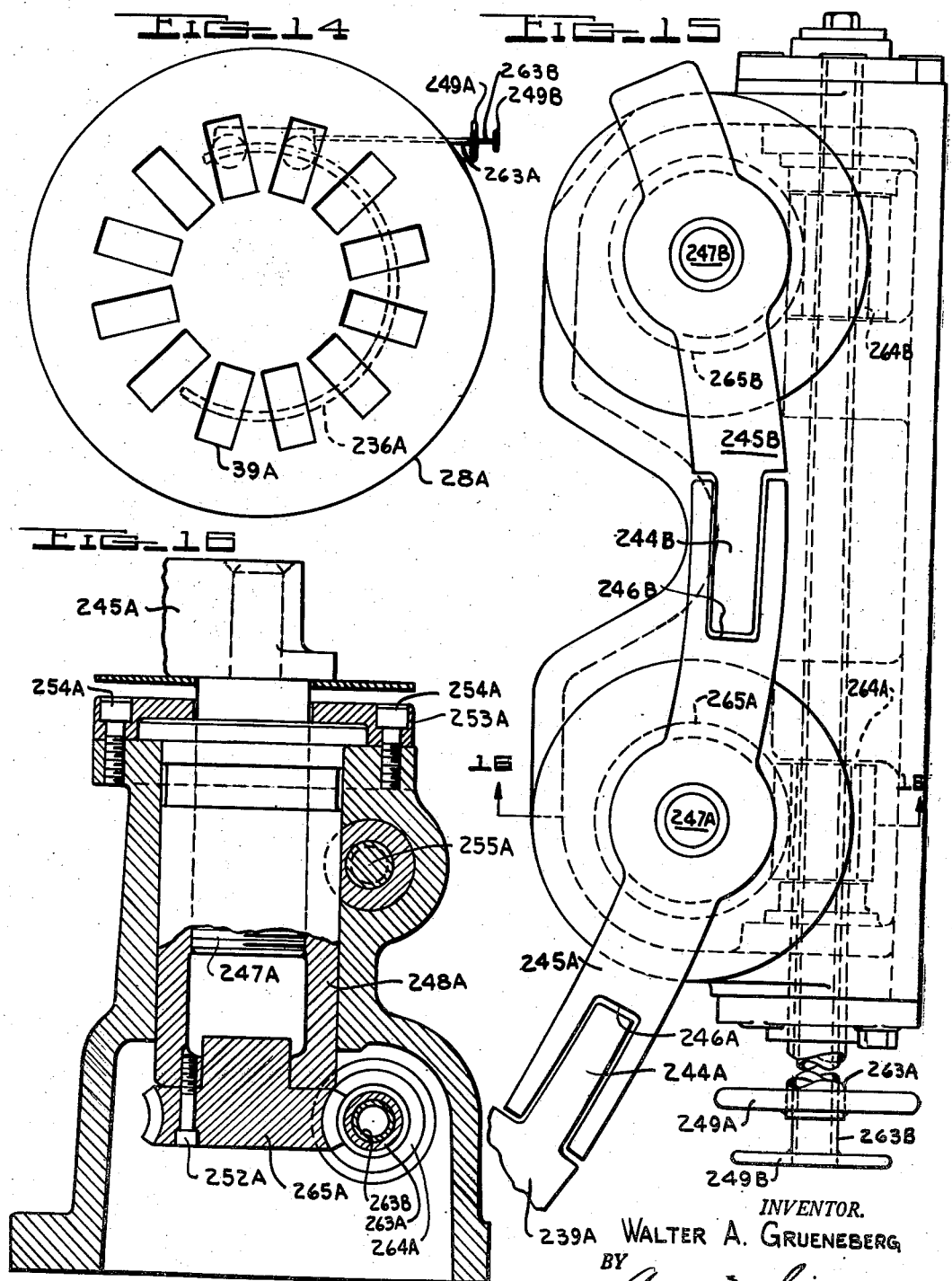

Patented Sept. 25, 1951

2,568,802

UNITED STATES PATENT OFFICE 2,568,802

MACHINE FOR THE MANUFACTURE OF MOLDED BUILDING UNITS

Walter A. Grueneberg, Saginaw, Mich., assignor to Jackson & Church Company, Saginaw, Mich., a corporation of Michigan Application July 9, 1947, Serial No. 759,726

5 Claims. (Cl. 25—72)

The present invention relates to a machine for the manufacture of molded building units in the form of building blocks or bricks which utilize a binder of cement, lime, or the like, or similar materials, with any desired type of aggregate.

A primary object of the present invention is to provide a machine particularly adapted to the mass production of molded building units to obtain improved and uniform physical properties therein.

Another object of the present invention is to provide an automatic molding machine which will economically and rapidly manufacture building units by mass production methods, the machine being particularly characterized by a plurality of mold boxes, mounted in a rotatable table, and a plurality of work stations, disposed about said table, to perform progressively the necessary operations in the manufacture of molded building units as each of said mold boxes is successively indexed from one work station to the next by intermittent rotation of said table.

Other objects are to provide simplified and improved means for supply and controlling the supply of molding mix to the mold boxes, for compressing the said mix within each mold box so that the pressure may be regulated and maintained uniform for each unit, for stripping the compressed unit from each mold box and for indexing the table from one work station to the next without permitting appreciable inertial overshooting of the proper indexed position by the table.

Another object of the present invention is to provide an automatic molding machine of the character described in which each mold box carries a vertically movable plunger which comprises the bottom of the mold box and provides a depending track follower which rides along a track and determines the level of the plunger within the mold box in accordance with the level of the track, the track being upwardly inclined along one portion thereof for the purpose of ejecting formed building units from the mold boxes, and the track being vertically adjustable at another portion thereof, whereat the mold boxes are filled with molding mix, so as to determine the maximum molding mix capacity of the mold box.

Other objects of the present invention are to provide a machine for the automatic molding of building units and which provides an automatic means for effecting an essentially uniform flow of molding mix from a primary supply hopper to a feed drum at the average rate of consumption of mix by the machine, and for supply molding mix from the feed drum to the mold boxes at a constant molding mix pressure head.

Another object of the present invention is to provide a molding machine which is especially adapted for adjustment of interacting parts with respect to each other to permit ready adjustment of the machine for molding materials of various physical properties.

Other objects of this invention will appear in the following description and appended claims, reference being had to the accompanying drawings forming a part of this specification wherein like reference characters designate corresponding parts in the several views.

In the drawings:

Fig. 1 is a fragmentary top plan of a brick making machine embodying the present invention and showing its relation to the feed hopper, the guards for the pulley belt and gears being removed.

Fig. 2 is essentially a front elevational view of the machine shown in Fig. 1, with the feed hopper removed and with the guards for the pulley belt and gears in place.

Fig. 3 is essentially an enlarged fragmentary side view of the constant level feed mechanism taken in the direction of the arrows along the line 3—3 of Fig. 1, portions being broken away to show details of construction.

Fig. 4 is a reduced section showing the molding mix agitator mechanism and bottom of the agitator drum, taken in the direction of the arrows essentially along the broken line 4—4 of Fig. 3.

Fig. 5 is an enlarged fragmentary section through one of the scraper blades and taken in the direction of the arrows essentially along the line 5—5 of Fig. 4.

Fig. 6 is a side elevation partially in section showing details of the table drive and compression mechanism taken in the direction of the arrows along the line 6—6 of Fig. 1, the upper portions of the view being substantially in front elevation with the feed hopper removed, and the large forward gear, pulley, and pulley belt shown in phantom.

Fig. 7 is an enlarged fragmentary view of a portion of the table and indexing mechanism, taken in the direction of the arrows essentially along the line 7—7 of Fig. 9, portions of the table top being broken away to show details of construction.

Fig. 8 is a fragmentary section through a portion of the table indexing mechanism taken in the direction of the arrows essentially along the line 8—8 of Fig. 7.

Fig. 9 is essentially a fragmentary right end elevational view taken in the direction of the arrows along the line 9—9 of Fig. 2 and showing the track level adjusting mechanism.

Fig. 10 is a fragmentary section through the mold box plunger taken essentially in the direction of the arrows along the line 10—10 of Fig. 6.

Fig. 11 is essentially a fragmentary enlarged elevation partly in section taken in the direction of the arrows along the line 11—11 of Fig. 9, portions of the track level adjusting mechanism being sectioned to show details of construction.

Fig. 12 is a fragmentary bottom view of a portion of the compression mechanism, taken essentially in the direction of the arrows along the line 12—12 of Fig. 6.

Fig. 13 is a fragmentary section through the track level adjusting mechanism taken in the direction of the arrows essentially along the line 13—13 of Fig. 11.

Fig. 14 is a schematic plan view of the table and dual track level adjusting mechanism of a 12-pocket brick making machine, showing a modification of the present invention.

Fig. 15 is a fragmentary plan view of the dual track level adjusting mechanism adapted for use with a 12-pocket brick making machine as shown schematically in Fig. 14.

Fig. 16 is a fragmentary section through the dual track level adjusting mechanism taken essentially in the direction of the arrows along the line 16—16 of Fig. 15.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

*Section I.—General*

The present invention is hereinafter described by way of example in relation to a brick molding machine embodying the present invention and utilizing the process thereof to carry out in automatic succession the various steps in the manufacture of a structural building unit in the form of a brick from a mix of water, lime, and aggregate, it being understood that any other desired shape of building unit, or any other suitable mix may be similarly utilized without departing from the spirit of the present invention.

Three principal stages in the operation of the machine are associated respectively with three fixed work stations, comprising a mold box fill station, a compression station, and a stripper station, located essentially 120° apart around a rotatable table. Six mold boxes are symmetrically mounted in the top of the table and are carried progressively by intermittent rotation of the table from one station to the next. It is to be understood, however, that any desired number of stages, work stations, and mold boxes may be employed within the scope of the present invention.

Between the intermittent indexing cycles, the machine is stationary for a time interval denoted the work cycle, during which time a mold box is located at one of each of the three stations. The mold box at the fill station is filled with mix. The mix within the mold box at the compression station is compressed. The compressed mix or brick, which has been ejected from the mold box in the course of its movement from the compression station to the stripper station, is removed from the machine at the stripper station. The continuous action of the machine may be understood by following a single mold box through a complete cycle of the three work stages.

At the fill station, an empty mold box is filled with a suitable brick molding mix from a feed or agitator drum, which provides an improved mold box fill mechanism including an automatic float mechanism for insuring a constant head of molding mix within the agitator drum and an essentially continuously uniform flow of molding mix from the primary feed supply hopper to the agitator drum.

The rotatable table then indexes twice, permitting the filling of two mold boxes with molding mix and placing a third empty mold box at the fill station by the time the first mold box reaches the compression station, whereat the mix within the first mold box is compressed to the desired shape of the brick. Upon continued indexing of the table, the first mold box is replaced at the compression station by the second mold box, and a fourth mold box is brought to the fill station.

A compression plunger mechanism is carried by each mold box within the lower portion thereof and provides a depending portion which extends below the mold box and rides along a track running below a portion of the table concentrically therewith. As the first mold box leaves the compression station, the compression plunger is gradually raised within the mold box by virtue of an upwardly inclined portion of the track, and the compressed brick is ejected out of the top of the mold box to the level of the table top, from which position the compressed brick is removed to storage or treating kilns. The next indexing movement of the table returns the first mold box in its empty condition to the fill station as at the beginning of the cylce. The other mold boxes continue through the same cycle, so that a filling operation at the fill station and a compression operation at the compression station always occur simultaneously. An ejection operation always occurs during each indexing operation.

In view of the symmetry of construction and operation of the six sections of the table, a multiplicity of reference numbers is avoided by using identical reference numerals to denote corresponding parts of the six sections. In the description below a single section of the table and its appurtenances are followed through a complete brick making cycle of the machine. It will be understood that the other five sections of the table are essentially identical in construction and operation and follow through consecutively after the manner of the section described.

The overall features of the machine may be seen in Figs. 1 and 2. Fig. 1 shows the plan view of the molding mix supply hopper 25 which is supported by the angle iron frame work 26. The agitator drum 27 and rotatable table 28, which latter two are supported by the base or frame 29, are seen in both Figs. 1 and 2.

By operation of the feed control mechanism described in detail below, the molding mix flows through the hopper feed outlet 32 below the feed control gate 33 at the forward or left hand portion of the hopper 25, Figs. 1 and 3, to the forward portion of the endless belt 34.

The belt 34 is driven in the direction of the arrow 35, Fig. 3, by the belt drive motor 36 to the bolt 103 is clamped at the extreme right of the slot 102, and the position of the gate 33 remains as shown in Fig. 3, the arm 87 will be inclined upwardly toward the lever arm 85 and the pivot bolt 88 will be near the top of the slot 89. Accordingly a slight downward movement of the float 78 will lower the left end of arm 87 and raise the gate 33, thereby increasing the opening 32. However the float 78 must be raised sufficiently to lift the arm 85 the full length of the slot 89 before the gate 33 will begin to close.

If on the other hand the bolt 103 is clamped at the extreme left of the slot 102, and the position of the gate 33 remains as shown in Fig. 3, the cross arm 87 will be inclined downward toward the arm 85. In this position the float 78 will necessarily be lower than shown in Fig. 3 and the pivot 88 will be at the lower portion of the slot 89. A slight upward movement of the float 78 will raise the arm 85 and cause a corresponding closure of the gate 33. However the gate 33 will not begin to open until downward movement of the float 78 lowers the arm 85 the full length of the slot 89.

The above two examples of the setting of the feed regulating mechanism describe the position of the clamping bolt 103 within the slot 102 for two extreme positions of the float 78. In the usual case an intermediate adjustment is required. Before tightening the clamping bolt 103, the gate 33 is set at the desired extent of opening for average operating conditions, and the float 78 is adjusted at the level of the desired average head of mix within the drum 27. Then the slidable pivot bolt 88 is centrally located within the slot 89 and the clamping bolt 103 is tightened.

By the adjustments possible in the feed mechanism, a predetermined desirable average rate of flow of the mix through the forward hopper opening 32 may be achieved with the position of the float 78 above the mix within the drum 27 at a desirable and predetermined average level, which in turn is determined by the desired operating head of the mix within the drum 27. Small movements of the arm 85 to the limit determined by the slot 89 will not affect the adjustment of the arm 87 and the gate 33. The rate of flow of the mix from the hopper 25 to the belt 34 will remain essentially constant and uniform regardless of minor movements of the float 78 and lever 85. Thus excessive and frequent movement and consequent wear of the mechanism for the gate 33 is avoided.

As each mold box 39 indexes in turn to the mix discharge opening 42 and receives a charge of mix from the drum 27, the small increment by which the level of the mix and the float 78 within the drum 27 is lowered will not be transmitted immediately to the gate 33. By properly adjusting the opening of the gate 33 to permit a continuous flow of mix through the hopper opening 32 at the average rate of intermittent flow of the mix through the discharge opening 42, and by properly adjusting the pivot 88 centrally within the slot 89 when the float 78 is at its desired average level, the machine may operate continuously under average conditions without moving the gate 33. If for some reason or other the level of the float 78 and the slotted arm 85 rises or lowers sufficiently, the gate 33 will be lowered or raised to adjust the flow of mix correspondingly.

*Section III.—Table drive mechanism*

As may be best seen in Figs. 1 and 6, the table drive motor 109 is secured to the platform 112 by the plurality of bolts 113 and may be adjusted to tighten or slacken the multiple pulley belt 114 by the adjusting bolts 115. The platform 112 is pivotally secured to the motor support 116 by the hinges 117. The lower portions of the adjusting bolts 115 are pivotally secured to the platform 116 by the pivot pins 118. The support 116 rests on the heavy helmet 119, which in turn is supported by the frame 29. The assembly of the platform 116, helmet 119, and frame 29 is held together by the two vertical shafts 120, which are secured to the lower portion of the frame 29 and are capped by the nuts 121, and by the vertical table shaft 122, which is capped by the large nut 123.

The pulley sheave 124, driven by the table drive motor 109, drives the large pulley sheave 125 by means of the belt 114. Pulley 125 is mounted to rotate freely on shaft 126 without turning the latter, and is operatively connected through a gear chain, not shown, to drive the large gear 127. Shaft 126 is rotatably journaled in the frame 29.

Shaft 128 rotates in the two bearings 129, which are supported by the frame 29, and is driven by the large gear 127. The small gear 134 on the end of shaft 128 is keyed or welded to plate 135, which latter is keyed to plate 136 by the replaceable shear pin 137 for protection of the compression mechanism against jamming or overloading. Plate 136 in turn is keyed to shaft 128.

The large gear 138, mounted on and keyed to shaft 126, is driven by the small gear 134, Fig. 1, and provides the crank pin 139 which is coupled to one end of the reciprocating drive shaft 142 by means of the universal joint 143, Fig. 7. Thus reciprocating shaft 142 is operated from the table drive motor 109 through the above described linkage including pulleys 124 and 125, and gears 127, 134, and 138.

The opposite end of the reciprocating shaft 142 is secured to the universal joint 144, which in turn is secured by a pin 145 to the upper half 146 and lower half 147 of an indexing shoe, Figs. 7 and 9. The opposite ends of the shaft 142 are adjustably threaded into their respective universal joints 143 and 144 and are securely locked in proper linear adjustment by the double locking nuts 148. Fig. 2 shows the guard 149 for the pulleys 124 and 125 and belt 114, and the guard 152 for the gear 127. These guards 149 and 152 are removed in Figs. 1 and 6.

Referring to Figs. 6 through 9, the members 146 and 147 comprising the indexing shoe provide the upper and lower flange portions 153 and 154, respectively, and are assembled one above the other within the undercut channel groove 155. The groove 155 extends circumferentially around the table 28 and provides the upper undercut annulus 156 for the flange 153 of the upper shoe member 146, and the lower undercut annulus 157 for the flange 154 of the lower shoe member 147. The upper and lower shoe members 146 and 147 respectively are held together by the pivot pin 145 and by the pivot pin 158, which latter also pivotally secures the indexing dog 159 to the two members 146 and 147.

The dog 159 provides the spring pilot pin 162 for one end of the spring 163 which presses the dog 159 in indexing position toward the table 28. A similar pilot pin 164 for the other end of the spring 163 is provided by the plate 165 which is secured to the upper indexing shoe member 146 by the plurality of bolts 166.

Six notches 167 are evenly spaced around the circumference of the table 28 for ratch-ratchet carry the mix into the agitator drum 27, from whence the mix is fed to the brick making machine and converted into molded and compressed bricks by operation of the above outlined cycle which is described in detail below.

Section II.—Mold box fill station

Figs. 1 and 3 show a hopper supporting frame 26 which preferably comprises essentially a welded trestle work of angle and channel iron and which supports the hopper 25, the belt 34 and belt drive motor 36. The bottom surface 43 of the hopper 25 is adjustably supported directly above the top of the belt 34 and provides the upturned flange portions 44 which are adjustably secured to the external portions of the two sides and back of the hopper 25 by means of the plurality of adjustment slots 45 and bolts 46. Undue wear of the belt 34 by friction against the hopper bottom 43 may be thus avoided and a fine adjustment for the drop for the mix between the hopper opening 32 and the belt 34 is provided. The under side of the upper portion of the belt 34 rides on and is supported by the plate 47, which in turn is supported by upright portions of the frame 26, Fig. 3.

The belt drive motor 36 drives the shaft 49 to which it is coupled through the reduction gears 52 and the flexible coupling 53. The drive shaft 49 rotates in the two pillow block bearings 54, which are mounted on the frame 26, and drives the forward belt roller 55. The rear belt roller 56 is secured to and rotatable with the shaft 57, which rotates within the two horizontally adjustable pillow block bearings 58, the latter being adjustable by means of the adjusting screws 59 to permit regulation of the tension in the belt 34.

Details of the automatic feeding mechanism between the hopper 25 and agitator drum 27 are shown in Figs. 3, 4, and 5. The vertical shaft 62, driven by the motor 38 to which it is coupled through the speed reducer 63, is secured to the collar 64 by the pin 65 and rotates the scraper arms 66, which latter are secured to the collar 64 by the plurality of bolts 67. The scraper blades 37 are adjustably secured to the peripheral portions of the arms 66 by the bolts 68 which extend through the slotted bolt holes 69 in the scrapers 37. Each arm 66 is bent at 72 so that the scraper blade 37 secured thereto extends angularly downward towards its direction of motion and also extends essentially transverse to its direction of counterclockwise rotation within the bottom of the agitator drum 27, Figs. 4 and 5.

The scraper blades 37 continuously agitate and move the mix along the bottom of the drum 27. Concurrently, by intermittent counterclockwise rotation of the table 28, the mold boxes 39 are successively indexed to positions of alignment with the molding mix discharge opening 42 in the bottom of the agitator drum 27. The table 28 pauses for a sufficient time interval between each indexing movement to permit the mold box 39, which is aligned with the discharge opening 42, to be completely filled with mix from the drum 27. The speed of rotation of the scraper blades 37 is timed to allow the blades 37 to bring two loads of mix to the discharge opening 42 during each filling operation, insuring that sufficient mix is discharged into the open mold box 39 at the fill station to completely fill that mold box before the table indexes again.

Other details of the agitator drum 27 include the reinforced cover 73, Figs. 1 and 3, which partially covers the agitator drum 27 and supports the motor 38 and speed reducer 63. The cover 73 provides the reinforcing ribs 74 and is secured to the drum 27 by the plurality of bolts 75. Cleaning of the agitator drum 27 is permitted by the sliding clean out trap door 76. The reinforcing bracket 77, Figs. 2 and 6, is secured between the table frame 29 and the agitator drum 27.

The level of the mix in the drum 27 is maintained essentially constant by operation of the constant level feed mechanism, shown in enlarged detail Fig. 3, and operated by means of the float 78. The float 78 provides the bosses 79, which are pivotally attached to the depending bosses 82 of the drum cover 73 by the bolts 83, and extends forward from its pivot attachment in the direction of counterclockwise rotation of the scraper blades 37 around the interior of the drum 27, being thus given an essentially dogleg appearance in top view with an arcuate edge conforming to the inner periphery of the drum 27, as seen in dotted outline of the plan view Fig. 1.

Near the forward portion of the float 78 is the boss 84 which is pivotally secured to the lower end of the arm 85 by the pivot bolt 86. The upper end of the arm 85 provides the slot 89 for the pivotal and sliding attachment to one end of the cross arm 87 by the sliding pivot bolt 88. The other end of the arm 87 is rigidly secured to the upright arm 92. The arms 87 and 92 are pivotally mounted on the shaft 93 at their inarticulate juncture.

Opposite ends of the shaft 93 are rotatably mounted in the two bearings 94 provided by the two brackets 95, which brackets 95 are secured to the opposite sides of the hopper 25 by the plurality of bolts 96. The upright bracket 97 is integral with the collar 98 which is keyed to the shaft 93 by the key 99, Fig. 1, and also provides the arcuate slot 102 for the bolt 103 which adjustably secures the arm 92 to the bracket 97. Also at opposite ends of the shaft 93, just inside of the bearings 94, are the two segmental gears 104 which are keyed to the shaft 93 by their respective keys 105.

The forward or left hand portion of the hopper 25, Figs. 1 and 3, is open at 32 between the inclined front end plate 106 and the bottom hopper plate 43, but may be closed or partially closed by the control gate 33 which slides vertically in the grooves 107 provided for the ends thereof in the two brackets 95. The gate 33 also provides the two gear racks 108 and is supported in part against the pressure of the mix within the hopper 25 by pressure of the segmental gears 104 mating in geared relationship with the gear racks 108.

By the linkages shown, raising or lowering of the float 78 pivots the cross-arm 87 about the shaft 93, and thereby pivots the arm 92 and bracket 97 secured thereto and rotates the shaft 93 which is keyed to the bracket 97. Thus the segmental gears 104 are caused to pivot and drive the gear racks 108, lowering or raising the gate 33 in response to raising or lowering the float 78.

The relationship between the amount of opening of the gate 33 and the angle of the cross arm 87 is adjustable by loosening the clamping bolt 103 to permit movement of the arm 92 one way or the other relative to the bracket 97 to the extent permitted by the arcuate slot 102. Upon again clamping the arm 92 to the bracket 97 by tightening bolt 103, the amount of opening of the gate 33 by a given movement of the float 78 may be predetermined and regulated. For example if engagement with the dog 159 during each cycle in the reciprocating movement of the shaft 142. Upon each revolution of the large gear 138, the reciprocating shaft 142 pulls the shoe members 146 and 147 circumferentially along the grooved undercut channel 155. The dog 159 is thus pulled into one of the indexing notches 167 to index the table 28 one-sixth of a revolution. Each notch 167 is provided with a replaceable hardened wear plate 168 which receives the wear from repeated contacts with the indexing dog 159.

The heavy table 28 is prevented from overshooting the proper indexed position on each stroke of the reciprocating arm 142 by means of the friction brake shoe 169 which rides within the groove 155 and is spring pressed against the side of the table 28 to stop rotation thereof immediately upon completion of the indexing stroke of the arm 142, Figs. 1 and 6. Many suitable means for subjecting the table 28 to a continual friction drag sufficient to prevent overshooting of the indexed positions may be readily devised by the skilled technician or engineer. Accordingly the means employed in the present embodiment are only briefly described herein and comprise the pivotal lever arm linkage 173 shown in dotted line, Fig. 1, which is pivotally mounted to the frame 29 and couples the brake shoe 169 to the spring 174. Tension in the spring 174 is transmitted through the pivotal linkage 173 to hold the brake shoe 169 in continual friction contact against the side of the table 28. The tension in spring 174 is regulated by the adjusting bolt 175 which is adjustably secured to the bracket 176 provided by frame 29. The friction brake mechanism and the major portion of the groove 155 are normally covered by the guard 177 which is supported from the frame 29, as by the brackets 180, Fig. 2. The guard 177 has been removed in Figs. 6, 7, and 9.

The bulk of the table 28 comprises the heavy frame or casting 172, Fig. 7, which is rotatably mounted on the vertical table shaft 122, Fig. 6. The bearings 178 for the table shaft 122 are supported on the collar 179 which is secured to the table frame 172 by the bolts 182. The shaft 122 provides the shoulder 183, which rests upon a corresponding shelf 184 of the frame 29, and is secured at its lower end within the frame 29 by the heavy nut 185.

*Section IV.—Compression mechanism*

Fig. 6 shows details of the mold boxes 39 and the apparatus which compresses the mix 186 therein, left hand mold box. The replaceable vertical mold box side plates 187 are detachably secured within the table frame 172 to line the sides of each mold box 39 and to determine the surface contour of the sides of the finished brick 188, right hand mold box. Surrounding each mold box 39 and flush with the upper portions of the plates 187 are the horizontal wear plates 189 which essentially cover the top of the table frame casting 172 and are secured thereto by the plurality of screws 192, Fig. 1.

The heavy helmet 119 is directly over the position of the compression station and provides the reinforcing or backing plate 193. Secured to the under face of the backing plate 193 is the abutment plate 194 which lies across the horizontal wear plates 189 and covers the top of each mold box 39 as it indexes to the compression station.

Vertically movable within each mold box 39 and carried thereby as the table 28 rotates is the compression plunger 195. A replaceable wear plate 196 is secured to the top portion of each plunger 195 by the plurality of bolts 197. Extending transversely through each plunger 195 and projecting at opposite sides therefrom are the plurality of retaining pins 198. Each plunger 195 is prevented from falling through the bottom opening of its respective mold box 39 by contact between the outward projecting ends of the pins 198 and the retaining bars 199, which later are secured to the underside of the table frame 172 by the bolts 202 and project partially across the bottom opening of each mold box 39 as shown in Figs. 7 and 10.

The sectional view of Fig. 6 is taken through two compression plungers 195 and shows the recess 203 in each plunger 195 for the roller 204 which is journaled on the shaft 205. The shaft 205 is secured at opposite ends within the shaft hole 206 provided therefor within the sides of the plunger 195. The base of each plunger 195 provides a seat 207 which contacts the pusher plate 208 when the particular plunger 195 indexes at the compression station. The pusher plate 208 is adjustably spaced from the hollow cylindrical casting 209 by the shim 212, and the assembly is aligned and secured together by the centering pin 213.

The casting 209 is adapted for vertical sliding motion within the cylindrical slide bearing 214 during the compression stroke, which motion is effected by the pivotal action of the rocker arm 215 through the linkage of the cylindrical roller 216. The hardened wear plate 217 is secured to the under side of the upper portion of the casting 209 in contact with the top of the roller 216, and a similar hardened wear plate 218 is secured to the rocker arm 215 in contact with the lower portion of the roller 216.

Assembly of the rocker arm 215 on the shaft 222, which later is secured at its opposite ends within the frame 29, is facilitated by the eccentric pivot hole 223. Play between the shaft 222 and eccentric pivot hole 223 is avoided by means of the bolt 224 which is threaded into the side of the arm 215 essentially perpendicular to the shaft 222 and which may be tightened to force the shaft 222 snugly against its proper portion of the eccentric pivot hole 223.

The left hand end of the rocker arm 215, Fig. 6, provides the cylindrical socket 225 for the cylindrical bearing head 226 which is held within the socket 225 by the pin 227. The pin 227 extends through the cylindrical bearing 226 and is held at opposite ends within the sides of the socket 225.

The cylindrical bearing 226 is integrally connected with the lower portion 228 of the eccentric cam housing for the cam 229 by the rigid arms 232. The upper and the lower portions of the cam housing, 233 and 228 respectively, are joined by the bolts 234 to provide an enclosing bearing surface for the eccentric cam 229. Shaft 126 is keyed to the eccentric cam 229 by the key 235 and is driven by gear 138 through the above described gear linkage with table drive motor 109. Operation of cam 229 imparts a pivotal motion to rocker 215, which in turn drives the plunger 195 through its compression cycle.

Fig. 6 shows the plunger 195 at the top of its compression stroke whereby the molding mix 186 within the mold box 39 is compressed essentially to its final size between the hardened plates 194 and 196, above and below, and the side plates 187.

It is to be noted that the reciprocating indexing arm 142 and the compression mechanism both complete an operating cycle in synchronism with one rotation of the shaft 126. Accordingly the crank pin 139 may be readily positioned on the gear 138 in relation to the positioning of the eccentric cam 229 on the shaft 126 so that the plunger 195 will be undergoing its compression stroke while the table 28 is stationary at one of the indexed positions and the reciprocating shaft 142 is in its return stoke to re-engage the indexing dog 159 with one of the notches 167.

Upon completion of the compression stroke, the reciprocating arm 142 will reach its extreme right hand position, Fig. 1; the indexing dog 159 will be in position to engage the notch 167 upon the next leftward driving stroke of the arm 142, Fig. 7; and the right hand end of the rocker arm 215 will be in position to pivot downward and release the pressure between plate 208 and the plunger seat 207. Shortly thereafter the indexing mechanism rotates the table 28 and indexes the succeeding mold box 39 to the compression station. Meanwhile the mold box 39 which has just experienced the compression operation is carried by rotation of the table 28 from the compression station. The plunger 195 slides off the plate 208 and drops the roller 204 to the lower end of the inclined track portion 236, Fig. 2, which carries the rollers 204 and runs circumferentially under a portion of the table 28.

Section V.—Ejection mechanism and track adjustment

As the table 28 is rotated by operation of the indexing mechanism, the roller 204 which has just left the compression station gradually rises along the track 236 and raises the plunger 195 to eventually eject the compressed mix 186 from the mold box 39 when the roller 204 reaches the level track portion 237. Figs. 2 and 6 show the compressed brick 188 which has been completely ejected from the mold box 39 and awaits to be removed from the table 28 and conveyed to storage or treating kilns. Upon continued indexing of the table 28, the roller 204 is carried to the first track decline 238 which leads to an intermediate level track step 239, Figs. 9 and 11.

The various above numbered portions of the track extend circumferentially under the table 28 and are supported by the frame 29. Also secured to the frame 29 by the bolts 242 is the tongue plate 243 which forms a continuation of the level track step 239 and provides a second declined track portion 244 which leads to the vertically adjustable track portion 245 and fits within the slot 246 thereof, Figs. 9 and 11. Thus each roller 204 in its turn rolls continuously from the step 239 down the inclined upper tongue surface 244 to the vertically adjustable horizontal track portion 245, which latter lies immediately below the fill station and determine the level of the plunger 195 within the mold box 39. By accurately adjusting the level of the horizontal track portions 245, the amount of mix that can be received by the mold box 39 at the fill station is accurately controlled.

The adjustable level track portion 245 is secured to and supported by the vertical threaded shaft 247 which extends within the internally threaded sleeve 248, the latter being journaled in the frame 29. Thus by turning the handwheel 249, which is keyed to the sleeve 248 by the key 252, the threaded shaft 247 is raised or lowered and the level of the track portion 245 is correspondingly adjusted. The sleeve 248 is held down at its upper portion by the capping plate 253 which is bolted to the frame 29 by the bolts 254. Rotation of the track portion 245 about the vertical axis of the shaft 247 is prevented by the tongue 243 within the slot 246.

The sleeve 248 is securely clamped in its adjusted position by means of the clamping bolt 255, which draws the adjacent portions of the frame 29 together on opposite sides of the saw slot 256 and thereby clamps the frame 29 around the sleeve 248, Fig. 13. Lubrication between the frame 29 and the outer portion of the sleeve 248 is provided by the lubricating fitting 257 which leads to the grease reservoir 258 within the frame 29 and is connected with the plurality of grease holes 259 by the annular grease duct 260 within the sleeve 248.

Section VI.—Summary of operation

In operation of the present brick making machine, the molding mix is suitably supplied to hopper 25 from which it flows through the opening 32 to the continuously moving belt 34 and into the agitator drum 27. By means of the adjustable constant level feed mechanism comprising the float 78, the gate 33, and the adjustable linkage therebetween, the flow of mix through the hopper opening 32 is maintained essentially uniform at the rate of average consumption of the mix by the machine.

The rotating scraper blades 37, driven by motor 38, continuously agitate the mix within the drum 27 and drive it over the discharge outlet 42, thus insuring an adequate flow of mix through the outlet 42 and completely filling each mold box 39 as it is indexed in its turn under the discharge outlet 42. The feed control mechanism operated from float 78 also insures an essentially constant desired head of mix within the drum 27, thereby forcing the mix through the discharge outlet 42 at an essentially uniform pressure and rate of flow and achieving the required uniformity in the density of the mix which fills the mold box 39 at the fill station. As the mix flows into the mold box 39 from the feed drum 27, the depression thus caused in the mix within the feed drum 27 is immediately filled from the adjacent mix by operation of the rotating scraper blades 37. Also, the adjusting mechanism for the float 78 permits the constant level of the mix within the drum 27 to be adjusted for various types of mix.

From the fill station, the filled mold box 39 is rotated to the compression station by two successive increments of rotation of the table 28 in accordance with the ratch-ratchet operation between the indexing dog 159 and the notches 167 of the table 28. As described above, the movement of the dog 159 is effected by the reciprocating movement of the drive shaft 142, which in turn is operated by the table drive motor 109 through the belt 114 and above mentioned gear train including the large gear 138 and crank pin 139. The friction drag brake 169 provides an efficient and simple means for insuring that the table 28 will stop at its required indexed position.

At the compression station, plunger 195 within the lower portion of a filled mold box 39 slides onto the compression plate 208. Rotation of the table 28 ceases for the duration of the compression stroke.

The compression mechanism, including the rocker arm 215, is also operated by the table drive motor 109 in timed relationship with the table indexing mechanism as previously described. Immediately after the filled mold box 39 indexes at the compression station, the right hand arm of the rocker 215, Fig. 6, presses upward against the roller 216, to raise plunger 195 and compress the mix 186 within said mold box 39. Upon completion of the upward compression stroke, plunger 195 is lowered by its own weight upon the raising of the left arm of the rocker 215.

The compression plate 208, which is forced upward against the plunger seat 207 during the compression operation, provides a relatively broad area of contact with the plunger 195. Accordingly a reasonable tolerance in the alignment of the mold boxes 39 at the compression station is provided and the requirement for expensive precise indexing equipment is avoided.

During the downward movement of the right arm of rocker 215, the reciprocating arm 142 completes its return stroke so as to engage one of the notches 167 and be in position to turn the table 28 through another increment of rotation and to index another filled mold box 39 at the compression station and another empty mold box 39 at the fill station.

As rotation of the table 28 carries the mold box 39 from the compression station, the roller 204 rides along the upwardly inclined track 230 and causes gradual ejection of the compressed brick 188. Finally at the elevated horizontal track portion 237, the compressed brick 188 is completely ejected from the mold box 39 and is removed from the machine. Upon continued indexing of the table 28, the plunger 195 within the now empty mold box 39 is lowered as the roller 204 follows the declined track portions 238 and 244 to the vertically adjustable horizontal track portion 245 under the fill station, whereat the mold box 39 indexes under the discharge opening 42 and is filled with mix to the level of the upper surface of the horizontal wear plates 189 as at the start of the brick making cycle.

The track adjusting mechanism operated from the hand wheel 249 and including the sleeve 248 and threaded shaft 247, permits vertical adjustment of the level track portion 245 and correspondingly the level of the top of the mold box plunger 195 in accordance with various types of mix so that the amount of uncompressed mix required to fill the mold box 39 at the fill station will be the desired amount for the finished brick.

The above description has carried a single mold box through a complete brick making cycle of the machine. It is to be understood that the other mold boxes 39 complete the same cycle in succession and that the various work operations on the mold boxes 39 indexed at the various stations are proceeding simultaneously.

*Section VII.—Modified track adjustment, 12 mold box machine*

Figs. 14, 15, and 16 show a modified mechanism for vertically adjusting the track portion under the fill station of a brick machine similar to that described above, by employing a rotatable table 28A having twelve evenly spaced mold boxes 39A rather than six.

In this instance, six pairs of mold boxes 39A are carried through essentially the same cycle of operations described above in connection with the six mold box machine, except that at each station, the work operation is performed simultaneously on a pair of peripherally adjacent mold boxes 39A. The table 28A completes a revolution in the course of six equal increments of rotation, during which a pair of empty mold boxes 39A are first filled with mix, then indexed to a compression station, and then stripped of the compressed bricks and returned to the fill station for refilling with mix. Each succeeding pair of mold boxes 39A completes the cycle similarly.

The track, indicated generally in Fig. 14 by the numeral 236A, performs in the same manner and has essentially the same various components as the track described above in connection with the six mold box machine. However the track 236A under the fill station provides the two separately vertically adjustable level portions 245A and 245B which are secured to and supported by the threaded shafts 247A and 247B, respectively. Thus the level of the compression plunger (not shown but corresponding in function to the plunger 195) within each mold box 39A at the fill station may be independently adjusted so as to compensate for tendencies of one mold box 39A to receive more mix from the agitator drum (not shown but corresponding in function to the agitator drum 27) than the other adjacent mold box 39A.

As rotation of the table 28A carries the empty mold boxes 39A from the stripper station, the rollers (not shown but corresponding in function to the rollers 204) will ride along the declined track portion 244A to the vertically adjustable level track portion 245A. The forward end of the track portion 245A provides the slot 246A for the declined tongue extension 244A. The other end of the track portion 245A provides the slot 246B for the inclined tongue 244B of the second vertically adjustable level track portion 245B. The end portion of the track 245A which provides the slot 246B may be slightly declined so as to gradually meet the inclined tongue 244B and to avoid any sudden drop or step in the track which would otherwise result when the vertically adjustable track portion 245B is positioned substantially below the level of the track 245A. It is to be understood, that the track tongue portions 244A and 244B within the slots 246A and 246B, respectively, are inclined similarly to the tongue portion 244 within the slot 246 so as to permit the compression plungers within the mold boxes 39A to be gradually changed from one level to another.

With the table 28A at one of the indexed positions, a pair of mold boxes 39A will be at the feed station. One mold box being centrally located over a level portion of the track 145A and the other mold box 39A being centrally located over a level portion of the track 145B. Accordingly the level of each plunger in each of the mold boxes 39A at the feed station may be independently adjusted to insure that the proper amount of mix will be received by each mold box 39A.

Each of the two track portions 145A and 145B are vertically adjusted similarly to the adjustment of the track portion 145. A short horizontal tubular outer shaft 263A, concentric with an enclosed longer shaft 263B, is keyed to the worm gear 264A which is in driving relationship with the vertical gear 265A. The vertical gear 265A is keyed to the vertical internally threaded sleeve 248A by the bolts 252A. The outer shaft 263A is turned by operation of the hand wheel 249A thereby rotating the threaded sleeve 248A by means of the gear chain 264A—265A.

The threaded vertical shaft 247A is screwed into the sleeve 248A, so that raising or lowering of the track portion 245A is effected by turning the sleeve 248A. The sleeve 248A is journaled within the portion of the frame 29A which supports the track 236A, and is held in position by the capping collar 253A which is secured to the frame 29A by the bolts 254A. The portion of the frame 29A around the sleeve 248A is provided with a saw slot (not shown but corresponding in function to the saw slot 256), which permits the sleeve 248A to be clamped within the frame 29A upon tightening the bolt 255A so as to draw the said saw slot together.

The track portion 245B is similarly adjusted and clamped. The threaded shaft 247B is screwed into the internally threaded sleeve 248B and is raised or lowered by rotation of the said sleeve 248B, which in turn is keyed to the vertical gear 265B which is in driving relationship with the horizontal worm gear 264B secured to the end of the longer internal shaft 263B. Rotation of the internal shaft 263B is effected by the hand wheel 249B, permitting independent adjustment of the two track portions 145A and 145B.

I claim:

1. In a brick molding machine having a plurality of mold boxes within an intermittently rotatable table and being adapted for the continuous rapid production of bricks by selectively indexing said table with said mold boxes through a repeating work cycle comprising a mold box filling operation at a fill station, a molding mix compression operation at a compression station, and a stripper operation wherein the compressed mix is stripped from the machine, the combination of: a feed drum for molding mix at said fill station, means to fill said mold boxes with molding mix as said mold boxes index at said fill station and including a molding mix discharge opening in the bottom of said feed drum directly above said table and in alignment with the mold box indexed at said fill station, a primary mix supply hopper having an adjustable mix discharge gate opening therefrom into said feed drum, means within said feed drum to maintain a constant level and to insure a uniform pressure head of the mix therein during discharge of the mix therefrom into said mold boxes and including a float operatively coupled with said mix discharge gate of said hopper for opening and closing thereof in response to the falling or rising of said float and means to effect relative movement between the mix in said drum and said float to maintain the latter on the surface of the mix.

2. The combination in a brick molding machine as claimed in claim 1 and being further characterized in that said means to effect relative movement between the mix and drum is adapted to continuously agitate the mix within said feed drum and to continuously bring a fresh supply of mix over said discharge opening within the bottom of said drum and includes motor driven scrapers rotating within said drum below said float.

3. In a constant level feed mechanism for a brick molding machine, a primary supply hopper for molding mix, an adjustable discharge gate therefor, an operating lever means for opening and closing said gate, a feed drum adapted to receive molding mix from said primary supply hopper upon opening said gate, means adapted to ride on the surface of the molding mix within said feed drum to open or close said gate in response to the fall or rise of the level of the mix within said feed drum and comprising a float operatively coupled with said lever means, and means to avoid continual movement of said gate in response to minor movements of said float and comprising a limited free movement in the coupling between said lever means and said float.

4. The combination in a constant level feed mechanism for a brick molding machine as claimed in claim 3 and being further characterized in that means are provided to permit adjustment of the opening of said molding mix discharge gate according to the average rate of consumption of mix by said brick molding machine and comprising an adjustable coupling between said gate and said operating lever means therefor for adjusting the setting of said gate relative to the setting of said operating lever means.

5. The combination in a constant level feed mechanism for a brick molding machine as claimed in claim 3 and being further characterized in that a feed drum discharge opening for the molding mix is provided in said feed drum, and means are provided for continuously rotating the mix within said feed drum over said feed drum discharge opening and including motor-driven scrapers positioned below said float and rotated within said feed drum.

WALTER A. GRUENEBERG.

REFERENCES CITED

The following references are of record in the file of this patent:

UNITED STATES PATENTS

| Number | Name | Date |
|---|---|---|
| 686,370 | Volkersen | Nov. 12, 1901 |
| 1,872,520 | Stuckey | Aug. 16, 1932 |
| 1,925,416 | Stuckey | Sept. 5, 1933 |
| 2,408,221 | Michel | Oct. 1, 1946 |